(12) United States Patent
Sherman et al.

(10) Patent No.: US 9,658,391 B2
(45) Date of Patent: May 23, 2017

(54) ILLUMINATION DEVICE HAVING VISCOELASTIC LIGHTGUIDE

(71) Applicant: 3M INNOVATIVE PROPERTIES COMPANY, St. Paul, MN (US)

(72) Inventors: Audrey A. Sherman, Woodbury, MN (US); Ellen O. Aeling, Oakdale, MN (US); Michael A. Meis, Stillwater, MN (US); Kevin R. Schaffer, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/753,320

(22) Filed: Jun. 29, 2015

(65) Prior Publication Data

US 2015/0301274 A1 Oct. 22, 2015

Related U.S. Application Data

(63) Continuation of application No. 13/878,644, filed as application No. PCT/US2011/048930 on Aug. 24, 2011.

(60) Provisional application No. 61/391,766, filed on Oct. 11, 2010.

(51) Int. Cl.
*F21V 7/04* (2006.01)
*F21V 8/00* (2006.01)

(52) U.S. Cl.
CPC ......... *G02B 6/0091* (2013.01); *G02B 6/0035* (2013.01); *G02B 6/0053* (2013.01); *G02B 6/0065* (2013.01); *G02B 6/0068* (2013.01); *G02B 6/0073* (2013.01); *G02B 6/0083* (2013.01)

(58) Field of Classification Search
CPC .................................................... G02B 6/0035
USPC ........................................................ 362/607
See application file for complete search history.

(56) References Cited

U.S. PATENT DOCUMENTS

| | | |
|---|---|---|
| 8,309,650 B2 | 11/2012 | Determan |
| 8,378,046 B2 | 2/2013 | Determan |
| 8,557,378 B2 | 10/2013 | Yamanaka |
| 8,673,419 B2 | 3/2014 | Determan |
| 8,772,425 B2 | 7/2014 | Determan |
| 2005/0265029 A1 | 12/2005 | Epstein |
| 2006/0002141 A1* | 1/2006 | Ouderkirk ............ G02B 6/0001 362/609 |
| 2006/0291201 A1 | 12/2006 | Smith |

(Continued)

FOREIGN PATENT DOCUMENTS

| | | |
|---|---|---|
| WO | WO 2008/106915 A2 | 9/2008 |
| WO | WO 2010/005655 A2 | 1/2010 |

OTHER PUBLICATIONS

Knauss et al., W.G., "Nonlinearly Viscoelastic Behavior of Polycarbonate. I. Response under Pure Shear", Mechanics of Time-Dependent Materials, vol. 6, No. 3, Jan. 1, 2002, pp. 231-269.

(Continued)

*Primary Examiner* — Evan Dzierzynski
(74) *Attorney, Agent, or Firm* — Daniel J. Iden

(57) ABSTRACT

Illumination device having a viscoelastic lightguide and a flexible light source is described. The flexible light source includes a plurality of electrically interconnected light emitting diodes disposed on a flexible mat and optically coupled to the viscoelastic lightguide.

10 Claims, 9 Drawing Sheets

(56) References Cited

U.S. PATENT DOCUMENTS

| | | |
|---|---|---|
| 2007/0159833 A1 | 7/2007 | Netzel |
| 2008/0055931 A1* | 3/2008 | Verstraete ............ G02B 6/0068 |
| | | 362/612 |
| 2008/0062688 A1* | 3/2008 | Aeling ...................... F21K 9/50 |
| | | 362/241 |
| 2008/0284945 A1* | 11/2008 | Schultz ................ G02B 6/0016 |
| | | 349/65 |
| 2008/0285304 A1* | 11/2008 | Rankin, Jr. .......... G02B 6/0036 |
| | | 362/602 |
| 2009/0126792 A1* | 5/2009 | Gruhlke et al. .............. 136/259 |
| 2009/0207339 A1* | 8/2009 | Ajichi et al. ..................... 349/64 |
| 2009/0244690 A1* | 10/2009 | Lee ................................ 359/298 |
| 2010/0110667 A1 | 5/2010 | Takata |
| 2010/0201916 A1 | 8/2010 | Bierhuizen |
| 2010/0297406 A1 | 11/2010 | Schaffer |
| 2011/0020640 A1 | 1/2011 | Sherman |
| 2011/0165361 A1 | 7/2011 | Sherman |
| 2011/0268929 A1 | 11/2011 | Tran |

OTHER PUBLICATIONS

Parke, S., "Anelasticity and viscoelasticity in glass", British Journal of Applied Physics, vol. 14, Feb. 18, 1963, pp. 243-248.

Chu, "Viscoelastic Properties of Pressure Sensitive Adhesives", Handbook of Pressure Sensitive Adhesive Technology, Chapter 8, 2nd ed., 1989, 28 pp. (Applicant points out, in accordance with MPEP 609.04(a), that the year of publication, 1989, is sufficiently earlier than the effective U.S. filing date, Jun. 29, 2016, so that the particular month of publication is not an issue.).

* cited by examiner

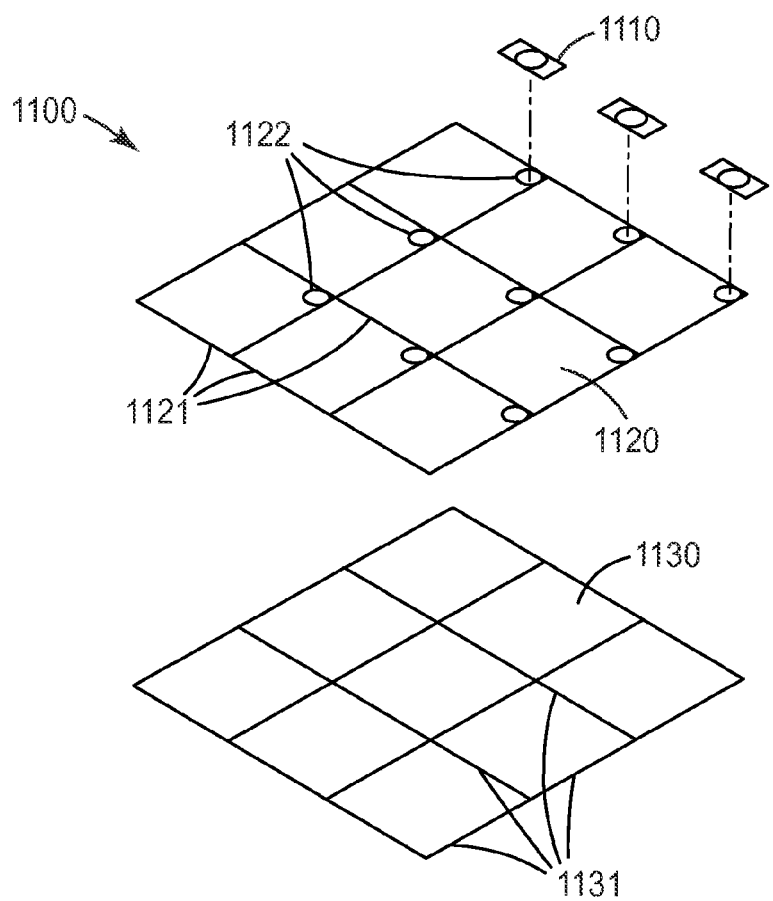
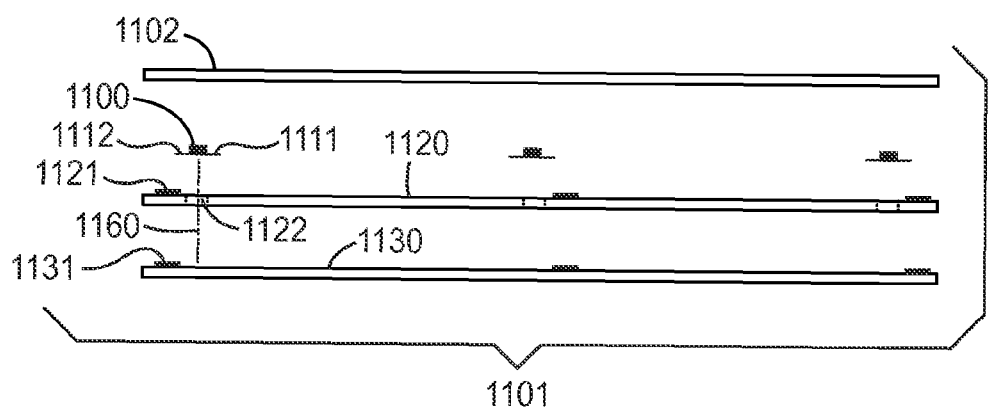
FIG. 11a
FIG. 11b

ILLUMINATION DEVICE HAVING VISCOELASTIC LIGHTGUIDE

FIELD

This disclosure relates to illumination devices, particularly illumination devices that include thin layers of circuitry and lightguides for facilitating distribution of light.

BACKGROUND

Illumination devices and fixtures typically utilize incandescent or fluorescent light sources contained in housings which are often large and bulky. For example, lighting fixtures and signs often utilize a large amount of space. Illumination devices can include FR circuit boards made of a rigid substrate such as fiberglass, patterned with copper traces and mounting holes for components. These types of illumination devices are stiff and rigid and not suitable for mounting onto curved or odd-shaped surfaces. Flexible illumination devices exist and are typically made of rugged polymeric film patterned with copper traces, however, they can be expensive and difficult to manufacture for various reasons.

Illumination devices can include a lightguide used to facilitate distribution of light from a light source over an area much larger than that of the light source. Lightguides comprise optically transmissive materials and may have different forms such as slab, wedge, and pseudo-wedge forms. Most lightguides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

SUMMARY

An illumination device is disclosed herein. In some embodiments, the illumination device comprises: a viscoelastic lightguide comprising opposing first and second major surfaces, a plurality of electrically interconnected light emitting diodes optically coupled to the viscoelastic lightguide, wherein light emitted by the light emitting diodes enters the viscoelastic lightguide at the first major surface and is transported within the viscoelastic lightguide by total internal reflection.

In some embodiments, the illumination device comprises: a viscoelastic lightguide comprising opposing first and second major surfaces; and a flexible light mat comprising a plurality of electrically interconnected light emitting diodes disposed on a flexible mat, the light emitting diodes optically coupled to the viscoelastic lightguide, wherein light emitted by the light emitting diodes enters the viscoelastic lightguide at the first major surface and is transported within the viscoelastic lightguide by total internal reflection. The flexible mat may comprise: an insulator layer disposed between first and second conductor layers, the insulator layer having a plurality of first apertures; the second conductor layer having a plurality of second apertures; an optical film disposed on the second conductor layer opposite the insulator layer, the optical film having a plurality of third apertures and a plurality of fourth apertures; wherein the first, second and third apertures are aligned and the fourth is not aligned with the first, second and third apertures, and each light emitting diode is electrically connected to the first conductor layer through the first, second and third apertures, and the second conductor layer through the fourth aperture, such that the light emitting diodes are electrically interconnected by the first and second conductor layers.

These and other aspects of the invention are described in the detailed description below. In no event should the above summary be construed as a limitation on the claimed subject matter which is defined solely by the claims as set forth herein.

BRIEF DESCRIPTION OF DRAWINGS

Advantages and features of the invention may be more completely understood by consideration of the following figures in connection with the detailed description provided below. The figures are schematic drawings of various articles and are not necessarily drawn to scale.

FIG. 10b shows a schematic cross-sectional view of the exemplary illumination device comprising the flexible light source shown in FIG. 10a.

FIG. 11a shows a schematic perspective view of an exemplary flexible light source.

FIG. 11b shows a schematic cross-sectional view of the exemplary illumination device comprising the flexible light source shown in FIG. 11a.

DETAILED DESCRIPTION

Figure 1:
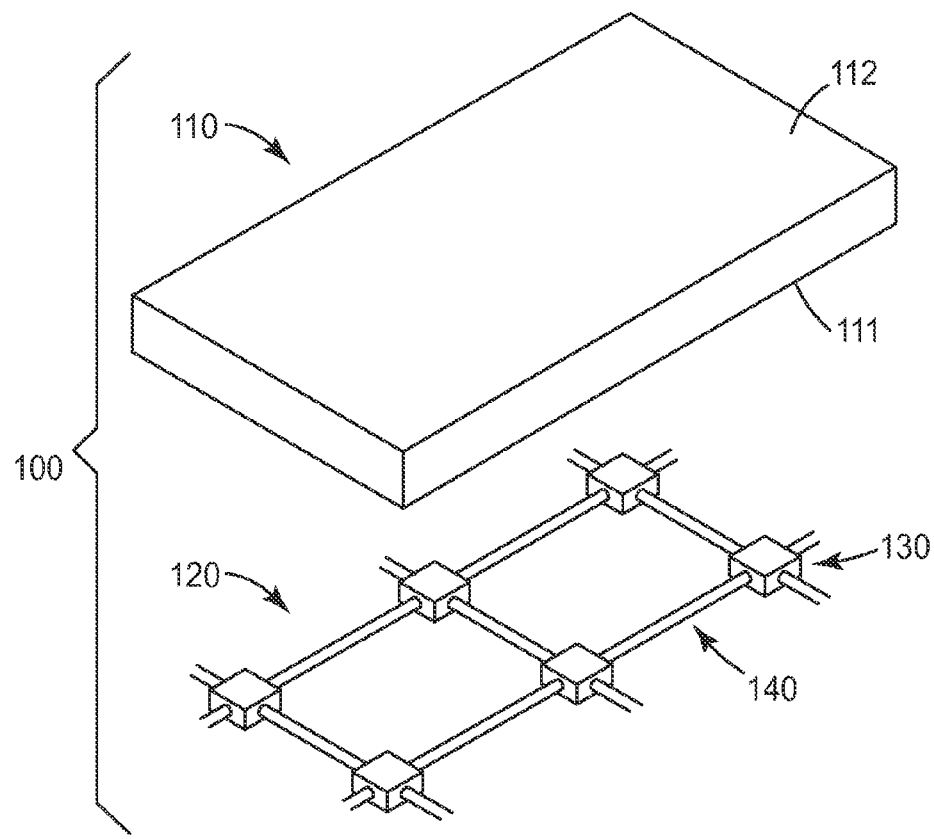
FIG. 1 shows a schematic perspective view of an exemplary illumination device disclosed herein.

FIG. 1 shows a schematic perspective view of an exemplary illumination device disclosed herein. In this embodiment, illumination device 100 comprises viscoelastic lightguide 110 and plurality of electrically interconnected light emitting diodes 120. Viscoelastic lightguide comprises opposing first and second major surfaces, 111 and 112, respectively. Plurality of electrically interconnected light emitting diodes 120 comprises plurality of light emitting diodes 130 that are electrically interconnected by conductive material 140. Plurality of electrically interconnected light emitting diodes 120 is generally planar and can be flexed by hand and wrapped around curved articles.

The viscoelastic lightguide is described in WO 2010/005655 (Sherman et al.), incorporated by reference herein. In general, the light emitting diodes are positioned relative to the viscoelastic lightguide such that the two are optically coupled, i.e., at least some light emitted by the light emitting diodes enters the viscoelastic lightguide. Light which enters the viscoelastic lightguide is distributed and/or delivered to one or more desired locations, areas, etc. of the lightguide. These desired locations, areas, etc. may be different for each illumination device, depending on the overall design of the device, the desired efficiency of the device, etc.

The viscoelastic lightguide manages light according to the principles of geometric optics, specifically the law of refraction and the principle of total internal reflection. These principles can be applied in conjunction with ray tracing techniques to determine theoretically how light can propagate, reflect and/or refract within the lightguide. This behavior of light may vary according to any number of variables such as the surface structure of the viscoelastic lightguide, the structure of an interface between the lightguide and a substrate in contact with the lightguide, the material compositions of the lightguide and the substrate, and the angular distribution of light that enters the lightguide. These optical principles are well known and are not presented here; for a detailed description of the behavior of light, see for example: D. S. Falk et al. in "Seeing the Light", John Wiley and Sons, Inc., 1986, pp. 53-56, and the Sherman et al. reference cited above.

In general, total internal reflection occurs when light having a particular angular component or distribution is incident upon an interface at one or more angles greater than the critical angle $_c$. At least a portion the first and/or second major surfaces of the viscoelastic lightguide comprises an optically smooth surface such that light incident upon the surface is not affected undesirably by the surface, e.g., the surface is free of defects having at least one dimension larger than the wavelength of the incident light. The optically smooth surface allows at least some of the light entering the viscoelastic lightguide to be reflected at the surface such that this light continues to propagate within the lightguide according to the principle of total internal reflection. For reflection of light incident on an optically smooth surface, the observed reflection angle is within about 10° of the calculated reflection angle. Total internal reflection occurs if a predetermined amount, or at least within about 10% of a predetermined amount, of light does not escape the viscoelastic lightguide unless it is intentionally extracted from the lightguide as described below.

Figure 2:
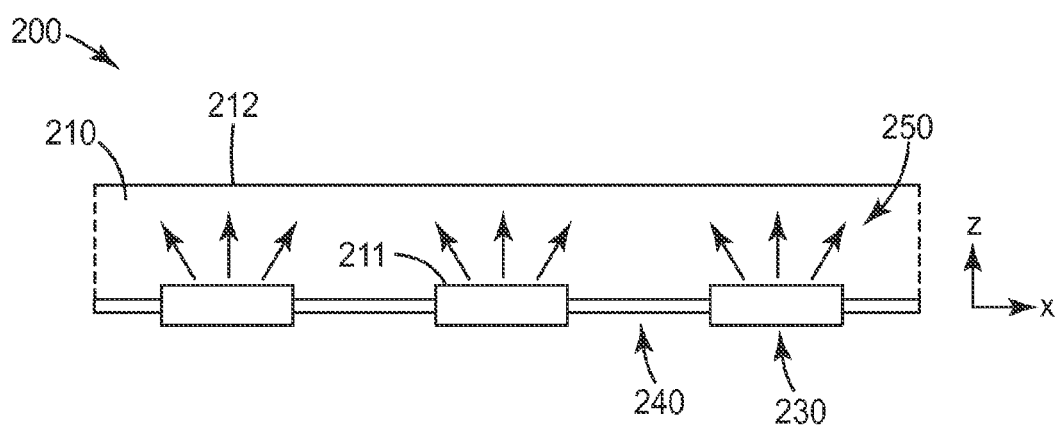
FIGS. 2-3, 4a-4b and 5-8 show schematic cross-sectional views of exemplary illumination devices disclosed herein.

The viscoelastic lightguide may be in direct contact with the light emitting diodes. FIG. 2 shows a schematic cross-sectional view of an exemplary illumination device disclosed herein. In this embodiment, illumination device 200 comprises viscoelastic lightguide 210 comprising opposing first and second major surfaces, 211 and 212, respectively, (for the purpose of illustration, first major surface 211 is identified at the interface with light emitting diode 230). A plurality of electrically interconnected light emitting diodes comprises plurality of light emitting diodes 230 that are electrically interconnected by conductive material 240. In this embodiment, light emitting diodes 230 are in contact with viscoelastic lightguide 210. The light emitting diodes emit light represented by rays 250 that enter the viscoelastic lightguide via first major surface 211.

Figure 3:
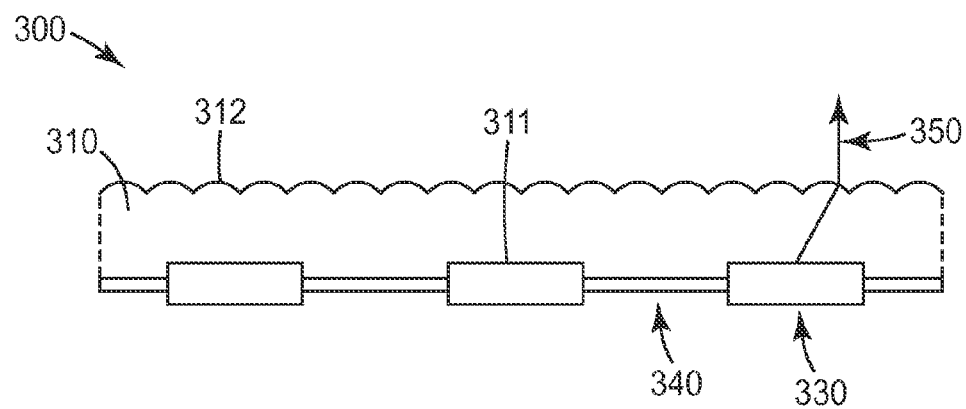

In some embodiments, the viscoelastic lightguide comprises a plurality of features oriented to emit light being transported within the viscoelastic lightguide. FIG. 3 shows a schematic cross-sectional view of an exemplary illumination device disclosed herein. In this embodiment, illumination device 300 comprises viscoelastic lightguide 310 comprising opposing first and second major surfaces, 311 and 312, respectively, (for the purpose of illustration, first major surface 311 is identified at the interface with light emitting diode 330). A plurality of electrically interconnected light emitting diodes comprises plurality of light emitting diodes 330 that are electrically interconnected by conductive material 340. In this embodiment, light emitting diodes 330 are in contact with viscoelastic lightguide 310. The light emitting diodes emit light represented by ray 350 that enter the viscoelastic lightguide via first major surface 311. In this embodiment, second major surface 312 comprises a plurality of features oriented to emit light being transported within the viscoelastic lightguide.

A structured surface of the viscoelastic lightguide comprises a plurality of features which may include protrusions and/or depressions having lenticular, prismatic, ellipsoidal, conical, parabolic, pyramidal, square, or rectangular shapes, or a combination thereof. Features comprising lenses (as shown for surface 312 in FIG. 3) are particularly useful for directing light to a preferred angular distribution. Features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. The features of a surface may have all the same shape, but the sizes of the shapes may vary in at least one dimension. The features of a surface may have different shapes, and the sizes of these features may or may not vary in any given dimension.

Surface structures of the features may also be varied. Surface structure of a feature generally refers to the substructure of the feature. Exemplary surface structures include optically smooth surfaces, irregular surfaces, patterned surfaces, or a combination thereof. For a given surface having a plurality of features, all or some of the features may have the same surface structure, or they may all be different. The surface structure of a feature may vary over portions of the feature. An optically smooth surface of a feature may form part of the optically smooth surface of the viscoelastic lightguide. The optically smooth surfaces of the feature and the viscoelastic lightguide may be continuous or discontinuous with each other. If a plurality of features is used, the surfaces of some features may be completely optically smooth or some may be partially optically smooth.

The number of features, if used, for a given structured surface is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be used to control the amount and/or direction of light that is extracted from the viscoelastic lightguide. The features may be arranged to obtain a desired optical effect. The features may be arranged to provide an image, extract light uniformly or as a gradient from the viscoelastic lightguide, hide discrete light sources, or reduce Moiré. This can be carried out generally by varying the shape, size, surface structure, and/or orientation of the features. If a plurality of features is used, then the number and/or arrangement of the features may be varied, as well as the orientation of the features relative to each other.

The shape of a feature may change the angular component of light which can increase or decrease the amount of light that is extracted from the viscoelastic layer. This may be the case if light propagates by total internal reflection within the viscoelastic lightguide and strikes a surface of a feature at an angle less than, equal to, or greater than the critical angle for the viscoelastic lightguide and an adjacent substrate. The amount of light that is extracted from the viscoelastic lightguide may increase or decrease accordingly. The size of a feature may be changed such that more or less light can reflect off a surface of the feature, thus increasing or decreasing the amount of light that is extracted from the viscoelastic layer. The surface structure of a feature may be used to control the distribution of light that is extracted from the viscoelastic layer. Light having a particular angular distribution may strike a feature and be extracted uniformly and/or randomly. Light may also be extracted uniformly and in a pattern, or randomly and in a pattern.

Figure 4A:
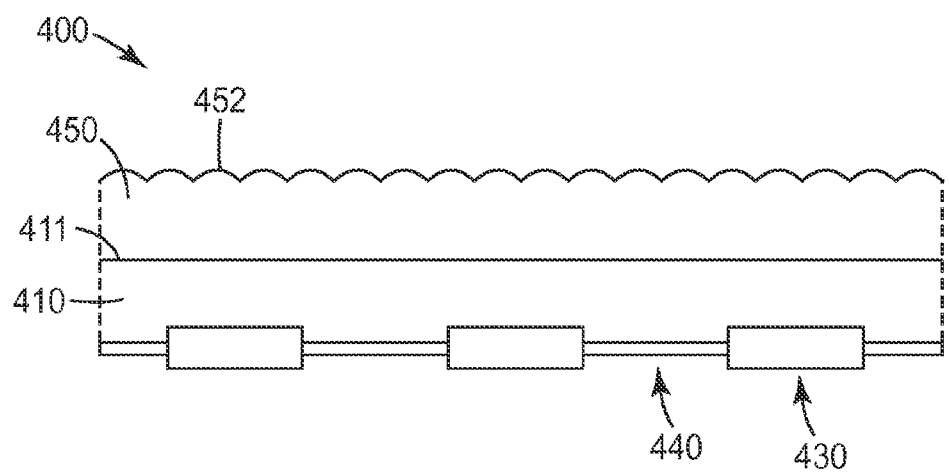

An optical film may be disposed on the second major surface of the viscoelastic lightguide. FIG. 4a shows a schematic cross-sectional view of an exemplary illumination device disclosed herein. In this embodiment, illumination device 400 comprises viscoelastic lightguide 410 and plurality of light emitting diodes 430 that are electrically interconnected by conductive material 440. In this embodiment, optical film 450 is disposed on the second major surface of the viscoelastic lightguide such that interface 411 is formed.

An optical film disposed on the second major surface of the viscoelastic lightguide may comprise a surface having a plurality of features oriented to emit light extracted from the viscoelastic lightguide. An embodiment in which a major surface of the optical film is structured is shown in FIG. 4a. Major surface 452 of optical film 450 comprises a structured surface oriented to emit light extracted from the viscoelastic lightguide. The features of structured surface 452 may have shapes, sizes, orientations, etc. as those described above for a surface of the viscoelastic lightguide.

Figure 4B:
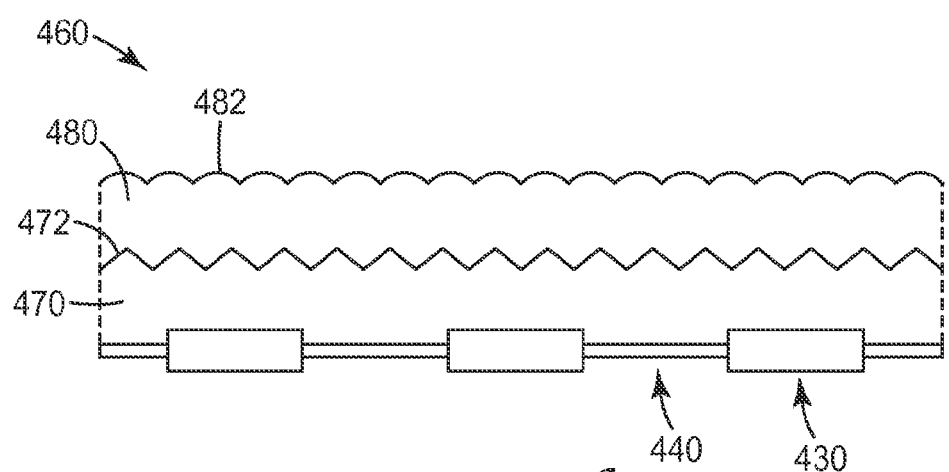

For embodiments in which an optical film is disposed on the second major surface of the viscoelastic lightguide, an interface formed between the optical film and the viscoelastic lightguide may comprise a plurality of features oriented to extract light being transported within the viscoelastic lightguide. An embodiment of a structured interface of an optical film and viscoelastic lightguide is shown in FIG. 4b. Illumination device 460 comprises viscoelastic lightguide 470 and plurality of light emitting diodes 430 that are electrically interconnected by conductive material 440. In this embodiment, optical film 480 is disposed on the second major surface of the viscoelastic lightguide such that structured interface 472 is formed. The features of the structured interface are oriented to extract light being transported within the viscoelastic lightguide. In this particular embodiment, major surface 482 of optical film 480 comprises a structured surface oriented to emit light extracted from the viscoelastic lightguide. The features of structured inter face 472 may have shapes, sizes, orientations, etc. as those described above for a surface of the viscoelastic lightguide. The major surface of the optical film may also be unstructured.

The viscoelastic lightguide is generally in contact with at least one medium such as the optical film described above. As used herein, "optical film" generally refers to a polymeric film or glass having light management capability for managing light in a predetermined way and is free of defects which would impair optical performance of a device. Optical films used in displays and signage, for example, are well known.

In some embodiments, the optical film has high light transmittance of from about 80 to about 100%, from about 90 to about 100%, from about 95 to about 100%, or from about 98 to about 100% over at least a portion of the visible light spectrum (about 400 to about 700 nm). In some embodiments, the optical film has a haze value of less than about 5%, less than about 3%, or less than about 1%. In some embodiments, the optical film has a haze value of from about 0.01 to less than about 5%, from about 0.01 to less than about 3%, or from about 0.01 to less than about 1%. Haze values in transmission can be determined using a haze meter according to ASTM D1003.

In some embodiments, the optical film comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The optical film may also have a light transmittance of from about 50 to about 100%.

In some embodiments, the optical film is hazy and diffuses light, particularly visible light. A hazy optical film may have a haze value of greater than about 5%, greater than about 20%, or greater than about 50%. A hazy optical film may have a haze value of from about 5 to about 90%, from about 5 to about 50%, or from about 20 to about 50%.

In some embodiments, the optical film may be translucent in that it reflects and transmits light.

The optical film may have a refractive index in the range of from about 1.3 to about 2.6, 1.4 to about 1.7, or from about 1.5 to about 1.7. The particular refractive index or range of refractive indices selected for the optical film may depend on the overall design of the illumination device and the particular application in which the device may be used.

The viscoelastic lightguide may also be in contact with a substrate that does not manage light, i.e., a substrate such as metal which completely reflects light. The viscoelastic lightguide may also be in contact with air or some other type of medium such as fabric. For the purpose of convenience, a viscoelastic lightguide in contact with a substrate is described below, but this substrate may comprise an optical film or any type of medium including air.

Given a particular substrate in contact with the viscoelastic lightguide, the amount of light extracted from the lightguide and by the substrate may be from about 10 to about 50%, from about 20 to about 50%, from about 30 to about 50%, from about 50 to about 70%, from about 50 to about 80%, or from about 10 to about 90% relative to the total amount of light that enters the lightguide.

The transmittance angle for light extracted from the viscoelastic lightguide by the substrate may be from greater than about 5° to less than about 95°, greater than about 5° to less than about 60°, or greater than about 5° to less than about 30°.

The viscoelastic lightguide may have a refractive index greater than that of the substrate. The refractive index of the viscoelastic lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the substrate.

The viscoelastic lightguide may have a refractive index less than that of the substrate. The refractive index of the viscoelastic lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the substrate.

The viscoelastic lightguide and the substrate may have the same or nearly the same refractive index such that light can be extracted into the substrate with little or no change to the light. The refractive index difference of the viscoelastic lightguide and the substrate may be from about 0.001 to less than about 0.002.

The refractive index difference of the viscoelastic lightguide and the substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

Useful substrates such as optical films comprise polymeric films and include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof.

The viscoelastic lightguide may have any bulk three-dimensional shape as is needed for a given application. The viscoelastic lightguide may be in the form of a square or rectangular layer, sheet, film, etc. The viscoelastic lightguide may be cut or divided into shapes as described below.

The thickness of the viscoelastic lightguide is not particularly limited as long as it can function as desired. The thickness of the viscoelastic lightguide may be selected based on or in conjunction with the light source. For example, design parameters may limit or even require that a particular light source(s) be used, and there may be a minimum amount, or range of amounts, of light that is required to enter the viscoelastic lightguide. Thus, the thickness of the viscoelastic lightguide may be selected so that the required amount of light from a given light source can enter the lightguide. A maximum thickness of the viscoelastic lightguide may be required for use in optical devices designed to be particularly thin. Exemplary thicknesses for the viscoelastic lightguide range from about 0.4 mil to about 1000 mil, from about 1 mil to about 300 mil, from about 1 mil to about 60 mil, or from about 0.5 mil to about 30 mil.

The amount and direction of light extracted from the viscoelastic lightguide may be controlled, at the very least, by the shape, size, number, arrangement, etc. of the features, the refractive indices of the viscoelastic lightguide and any medium with which the lightguide is in contact, the shape and size of the viscoelastic lightguide, and the angular distribution of light that is allowed to enter the viscoelastic lightguide. These variables may be selected such that from about 10 to about 50%, from about 20 to about 50%, from about 30 to about 50%, from about 50 to about 70%, from about 50 to about 80%, or from about 10 to about 90% of light is extracted from the viscoelastic lightguide relative to the total amount of light that enters the lightguide.

The viscoelastic lightguide comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a material designed to extract light from the lightguide, e.g., the substrate, such that the viscoelastic lightguide and the substrate are optically coupled. Light can then be extracted from the viscoelastic lightguide. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 g/in, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

In some embodiments, the viscoelastic lightguide is hazy and diffuses light, particularly visible light. A hazy viscoelastic lightguide may have a haze value of greater than about 5%, greater than about 20%, or greater than about 50%. A hazy viscoelastic lightguide may have a haze value of from about 5 to about 90%, from about 5 to about 50%, or from about 20 to about 50%.

In some embodiments, the viscoelastic lightguide may be translucent in that it reflects and transmits light.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the optical device and the particular application in which the device may be used.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs are described in detailed in the Sherman et al. references cited above. Only a brief description of useful PSAs is included here. Exemplary poly(meth)acrylate PSAs are derived from: monomer A comprising at least one monoethylenically unsaturated alkyl (meth)acrylate monomer and which contributes to the flexibility and tack of the PSA; and monomer B comprising at least one monoethylenically unsaturated free-radically copolymerizable reinforcing monomer which raises the Tg of the PSA and contributes to the cohesive strength of the PSA. Monomer B has a homopolymer glass transition temperature (Tg) higher than that of monomer A. As used herein, (meth)acrylic refers to both acrylic and methacrylic species and likewise for (meth)acrylate.

Preferably, monomer A has a homopolymer Tg of no greater than about 0° C. Preferably, the alkyl group of the (meth)acrylate has an average of about 4 to about 20 carbon atoms. Examples of monomer A include 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. The alkyl group can comprise ethers, alkoxy ethers, ethoxylated or propoxylated methoxy (meth)acrylates. Monomer A may comprise benzyl acrylate.

Preferably, monomer B has a homopolymer Tg of at least about 10° C., for example, from about 10 to about 50° C. Monomer B may comprise (meth)acrylic acid, (meth)acrylamide and N-monoalkyl or N-dialkyl derivatives thereof, or a (meth)acrylate. Examples of monomer B include N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam.

In some embodiments, the (meth)acrylate PSA is formulated to have a resultant Tg of less than about 0° C. and more preferably, less than about −10° C. Such (meth)acrylate PSAs include about 60 to about 98% by weight of at least one monomer A and about 2 to about 40% by weight of at least one monomer B, both relative to the total weight of the (meth)acrylate PSA copolymer.

Useful PSAs include natural rubber-based and synthetic rubber-based PSAs. Rubber-based PSAs include butyl rubber, copolymers of isobutylene and isoprene, polyisobutylene, homopolymers of isoprene, polybutadiene, and styrene/butadiene rubber. These PSAs may be inherently tacky or they may require tackifiers. Tackifiers include rosins and hydrocarbon resins.

Useful PSAs include thermoplastic elastomers. These PSAs include styrene block copolymers with rubbery blocks of polyisoprene, polybutadiene, poly(ethylene/butylene), poly(ethylene-propylene). Resins that associate with the rubber phase may be used with thermoplastic elastomer PSAs if the elastomer itself is not tacky enough. Examples of rubber phase associating resins include aliphatic olefin-derived resins, hydrogenated hydrocarbons, and terpene phenolic resins. Resins that associate with the thermoplastic phase may be used with thermoplastic elastomer PSAs if the elastomer is not stiff enough. Thermoplastic phase associating resins include polyaromatics, coumarone-indene resins, resins derived from coal tar or petroleum.

Useful PSAs include tackified thermoplastic-epoxy pressure sensitive adhesives as described in U.S. Pat. No. 7,005,394 (Ylitalo et al.). These PSAs include thermoplastic polymer, tackifier and an epoxy component.

Useful PSAs include polyurethane pressure sensitive adhesive as described in U.S. Pat. No. 3,718,712 (Tushaus). These PSAs include crosslinked polyurethane and a tackifier.

Useful PSAs include polyurethane acrylate as described in US 2006/0216523 (Shusuke). These PSAs include urethane acrylate oligomer, plasticizer and an initiator.

Useful PSAs include silicone PSAs such as polydiorganosiloxanes, polydiorganosiloxane polyoxamides and silicone urea block copolymers described in U.S. Pat. No. 5,214,119 (Leir, et al). The silicone PSAs may be formed from a hyrosilylation reaction between one or more components having silicon-bonded hydrogen and aliphatic unsaturation. The silicone PSAs may include a polymer or gum and an optional tackifying resin. The tackifying resin may comprise a three-dimensional silicate structure that is endcapped with trialkylsiloxy groups.

Useful silicone PSAs may also comprise a polydiorganosiloxane polyoxamide and an optional tackifier as described in U.S. Pat. No. 7,361,474 (Sherman et al.) incorporated herein by reference. Useful tackifiers include silicone tackifying resins as described in U.S. Pat. No. 7,090,922 B2 (Zhou et al.) incorporated herein by reference.

The PSA may be crosslinked to build molecular weight and strength of the PSA. Crosslinking agents may be used to form chemical crosslinks, physical crosslinks or a combination thereof, and they may be activated by heat, UV radiation and the like.

In some embodiments, the viscoelastic lightguide comprises a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic lightguide comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic lightguide comprises a PSA formed from at least one monomer containing a substituted or an unsubstituted aromatic moiety as described in U.S. Pat. No. 6,663,978 B1 (Olson et al.).

In some embodiments, the viscoelastic lightguide comprises a copolymer as described in U.S. Pat. Nos. 8,378,046 and 8,772,425 (Determan et al.), comprising (a) monomer units having pendant bephenyl groups and (b) alkyl (meth) acrylate monomer units.

In some embodiments, the viscoelastic lightguide comprises a copolymer as described in U.S. Pat. No. 8,309,650 (Determan et al.), comprising (a) monomer units having pendant carbazole groups and (b) alkyl (meth)acrylate monomer units.

In some embodiments, the viscoelastic lightguide comprises an adhesive as described in U.S. Publication 2010/0297406 (Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl (meth) acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic lightguide may comprise a stretch releasable PSA. Stretch releasable PSAs are PSAs that can be removed from a substrate if they are stretched at or nearly at a zero degree angle. In some embodiments, the viscoelastic lightguide or a stretch release PSA used in the viscoelastic lightguide has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or U.S. Publication 2011/0020640 (Sherman et al.) and U.S. Pat. No. 8,673,419 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

In some embodiments, the stretch releasable PSA may comprise an acrylate-based PSA as described in U.S. Pat. No. 8,557,378 (Yamanaka et al.) and U.S. Publication 2011/0268929 (Tran et al.) Such acrylate-based PSAs include compositions of an acrylate, an inorganic particle and a crosslinker. These PSAs can be a single or multilayer.

The viscoelastic lightguide can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic lightguide may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic lightguide by incorporating bubbles into the lightguide. The bubbles may have a diameter of from about 0.01 to about 1 um. Bubbles may be introduced by adding, e.g., foaming agents. Examples of additional additives that may be added to the viscoelastic lightguide include glass beads, reflective particles, and conductive particles. In some embodiments, the viscoelastic lightguide may comprise a PSA matrix and particles as described in U.S. Publication 2011/0165361 (Sherman et al.), comprising an optically clear PSA and silicon resin particles having a refractive index less than that of the PSA, and incorporated herein by reference. In some embodiments, the presence of particles, bubbles, air, etc. increases the scatter and uniformity of light.

In some embodiments, the viscoelastic lightguide provides an image. An image may be made by structuring a surface of the lightguide as described above. For example, surface 312 shown in FIG. 3 may be structured to provide the image. An image may be made by including or embedding material such as particles in the viscoelastic lightguide. The image may also be made by forming an image on a surface of the lightguide, e.g., on surface 312 shown in FIG. 3. More than one surface of the lightguide may comprise an image. Surfaces of the viscoelastic lightguide may be imaged by printing or marking, e.g., by inkjet printing, laser printing, electrostatic printing and the like. Images may be monochrome such as black and white, or they may be colored. The materials used to form the images may reflect all or some light within a particular range of wavelengths, e.g., in the visible region. The materials used to form the images may function as color filters allowing light within a particular range of wavelengths, e.g., in the visible region, to be transmitted. Exemplary materials include colorants such as pigments and dyes.

Figure 5:
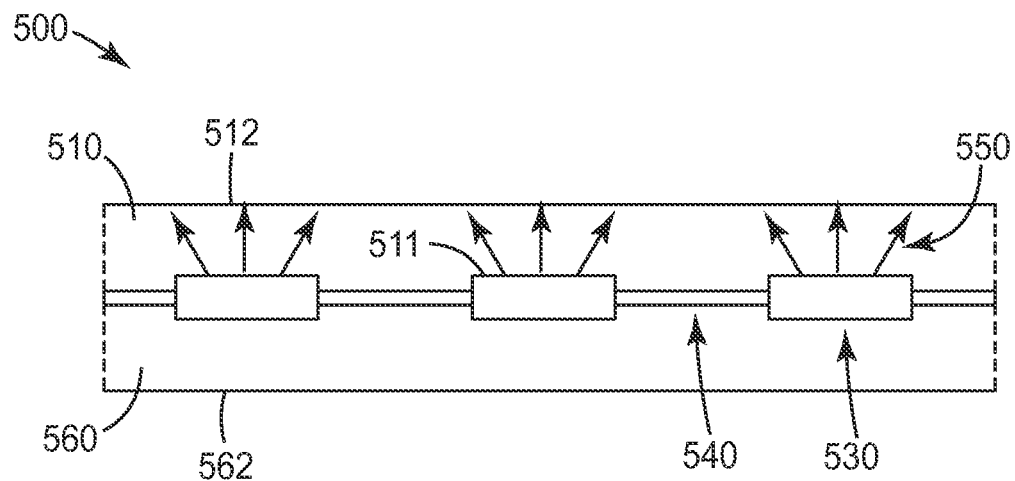

The illumination device disclosed herein may comprise a substrate such that the light emitting diodes are disposed between the viscoelastic lightguide and the substrate. FIG. 5 shows a schematic cross-sectional view of an exemplary illumination device disclosed herein. In this embodiment, illumination device 500 comprises viscoelastic lightguide 510 and plurality of light emitting diodes 530 that are electrically interconnected by conductive material 540. Further included is substrate 560, and the light emitting diodes are disposed between the viscoelastic lightguide and the substrate. Outer surface 562 of the substrate is also shown. Substrate 560 may comprise an optical film as described above, or it may comprise air, metal or fabric as described above.

Figure 6:
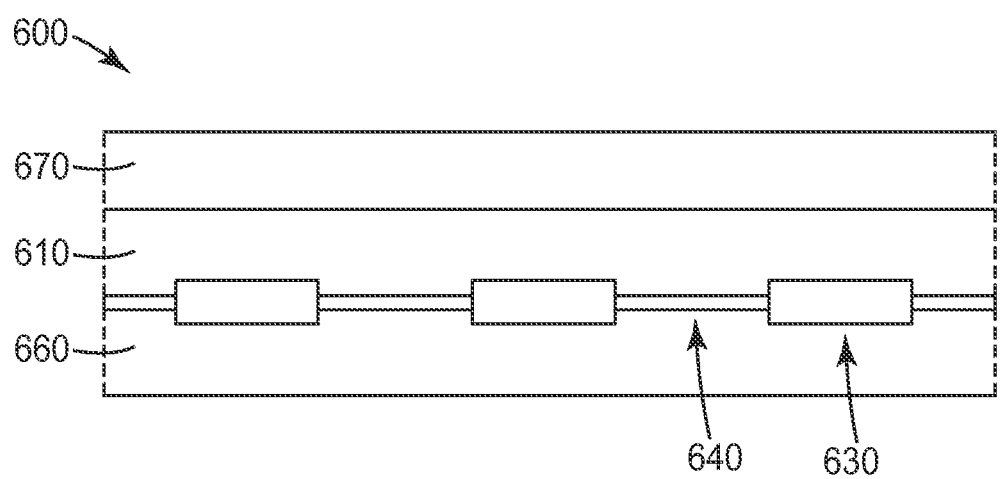

FIG. 6 shows a schematic cross-sectional view of an exemplary illumination device disclosed herein. In this embodiment, illumination device 600 comprises viscoelastic lightguide 610 and plurality of light emitting diodes 630 that are electrically interconnected by conductive material 640. Further included is first substrate 660 and second substrate 670, and these substrates may be any of those described above. Any one of the surfaces or the interface may be structured as described above.

The light emitting diode may be optically coupled to the viscoelastic lightguide such that at least some of the light from the light emitting diode can enter the lightguide. For example, a light emitting diode may be optically coupled to the viscoelastic lightguide such that greater than 1, greater than 10, greater than 20, greater than 30, greater than 40, greater than 50, greater than 90%, or about 100% of light emitted by the light emitting diode enters the viscoelastic lightguide. For another example, a light emitting diode may be optically coupled to the viscoelastic lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light emitting diode enters the viscoelastic lightguide. The light emitting diode may emit light having a random or a particular angular distribution.

In general, the light emitted by the light emitting diode may be visible or invisible. At least one light emitting diode may be used. For example, from 1 to about 10,000 light emitting diodes may be used. The light emitting diode may comprise a row of LEDs positioned at or near an edge of the viscoelastic lightguide. The light emitting diode may comprise LEDs arranged on a circuit such that light emitted from the LEDs lights up continuously or uniformly the viscoelastic lightguide throughout a desired area. The light emitting diode may comprise LEDs that emit light of different colors such that the colors can mix within the viscoelastic lightguide. In this way, a graphic could be designed to appear differently at different times during its use.

The light emitting diode may be powered by any suitable means. The light emitting diode may be powered using a battery, a DC power supply, an AC to DC power supply, an AC power supply, or a solar photovoltaic cell.

The viscoelastic lightguide can be used in a variety of multilayer constructions depending on the particular application. Some of these embodiments are described below.

In some embodiments, the illumination device includes light emitting diodes which are side emitting diodes. A side emitting diode emits light predominately from the sides of the LED die, and little or no light is emitted from the top of the die. For example, a side emitting diode may emit light such that less than 10% or less than 20% of light is emitted from the top of the LED die.

Figure 7:
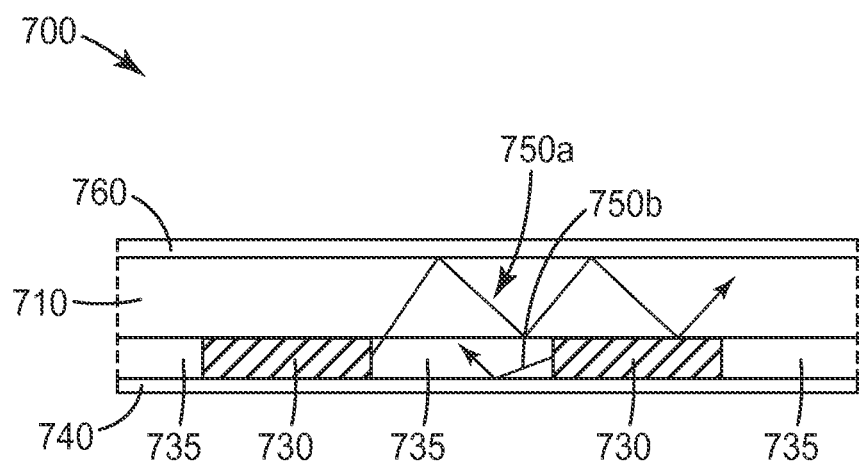

FIG. 7 shows a schematic cross-sectional view of an exemplary illumination device disclosed herein. In this embodiment, illumination device 700 comprises viscoelastic lightguide 710 and plurality of side emitting diodes 730 that are electrically interconnected by conductive substrate 740. The light emitting diodes and conductive substrate may be part of a flexible light mat as described below. Regions 735 may comprise a polymeric material such as any of those described above for the optical film. The polymeric material may have any properties as described above for the optical film. As such, light emitted by the light emitting diodes may be emitted into the polymeric material, as shown by rays 750*a* and 750*b*. The polymeric material may have properties such that light emitted into it is extracted by the viscoelastic lightguide, as shown by ray 750*a*, according to principles of geometric optics described above. Regions 735 may comprise air. Optical film 760 is disposed on viscoelastic lightguide 710. In some embodiments, the optical film diffuses light.

Figure 8:
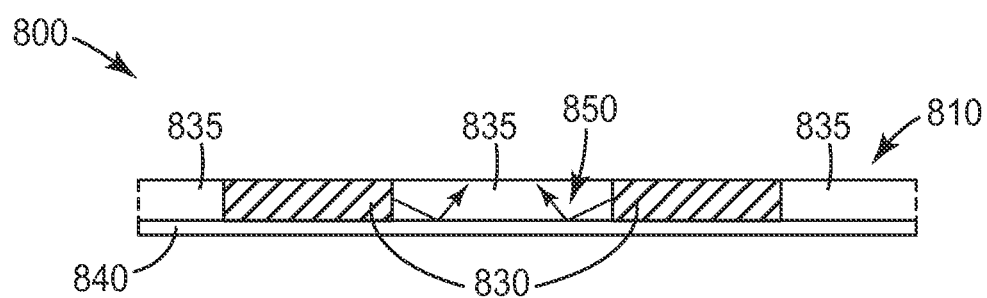

FIG. 8 shows a schematic cross-sectional view of an exemplary illumination device disclosed herein. In this embodiment, illumination device 800 comprises viscoelastic lightguide 810 comprising regions 835, and plurality of side emitting diodes 830 that are electrically interconnected by conductive substrate 840. The light emitting diodes and conductive substrate may be part of a flexible light mat as described below. Light emitted by the side emitting diodes is represented by rays 850.

Figure 9A:
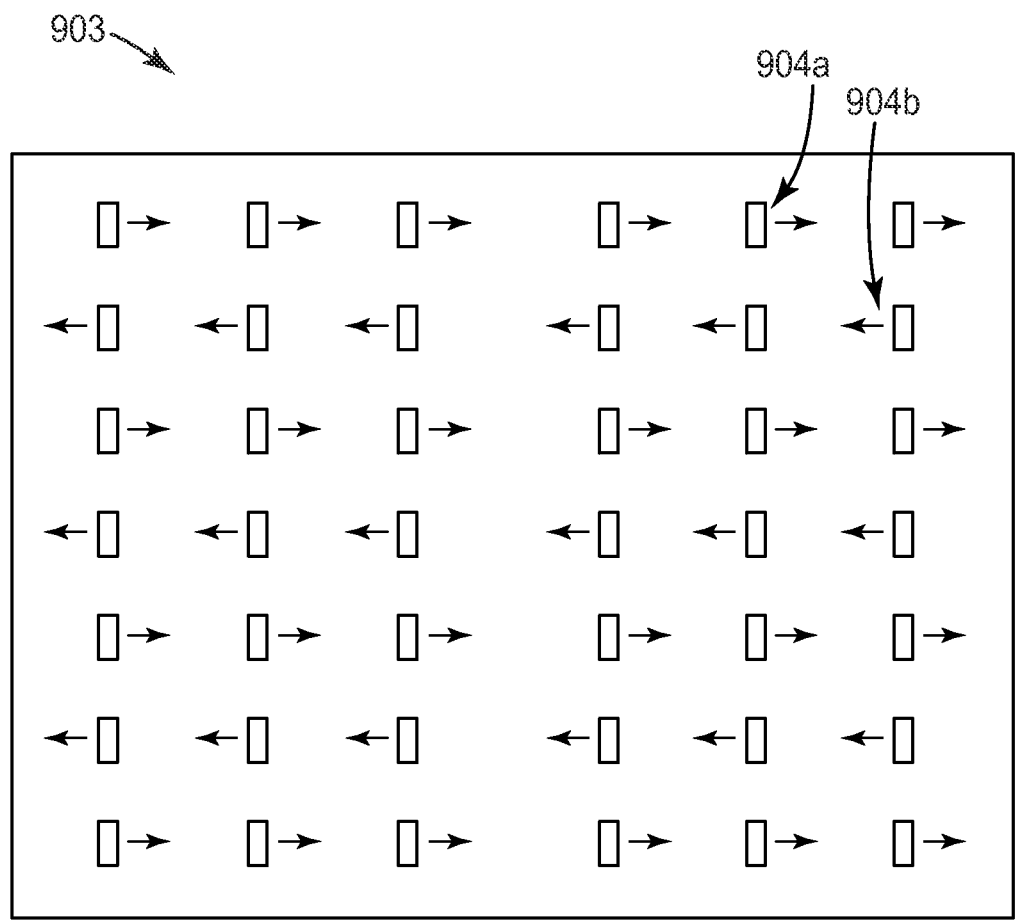
FIGS. 9a-9c show schematic plan views of light sources.
Figure 9B:
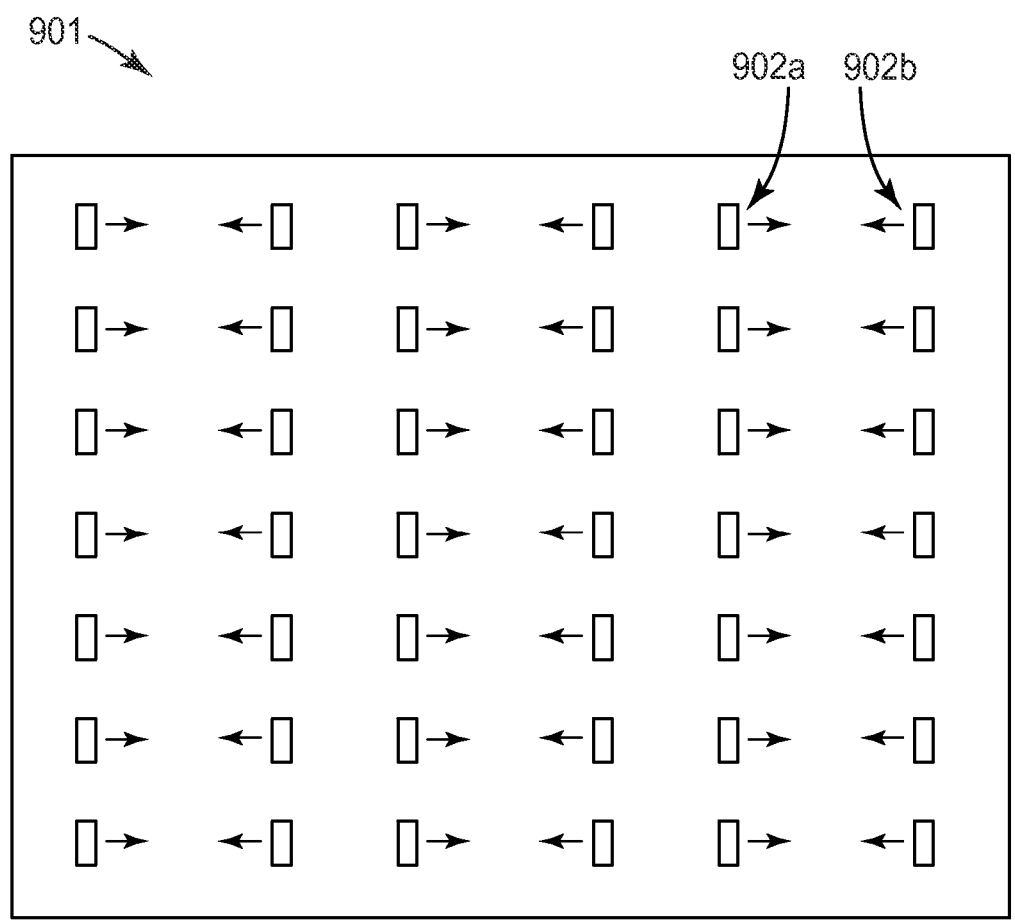
Figure 9C:
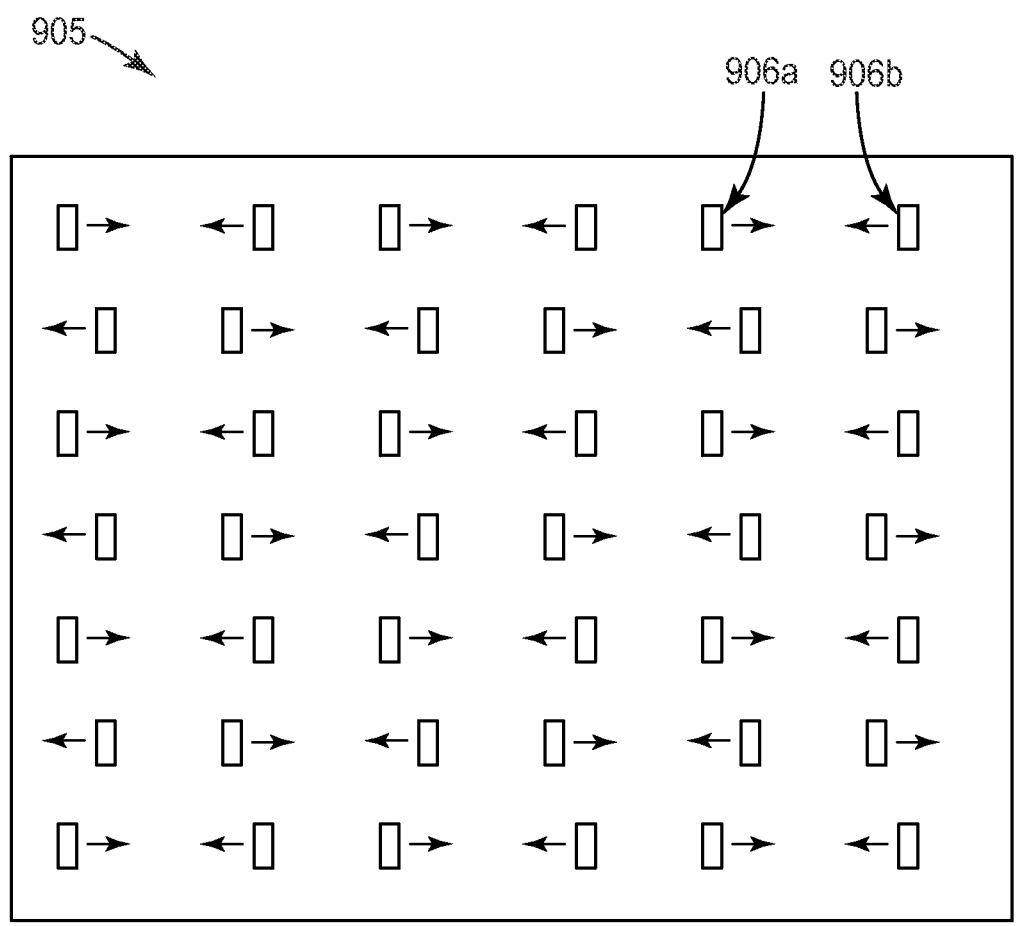

Side emitting diodes can be arranged in different configurations depending on the desired use of the illumination device. FIGS. 9*a*-9*c* show schematic plan views of light sources. In FIG. 9*a*, light source 903 comprises side emitting diodes arranged in alternating first and second adjacent rows, and the light emitting diodes in the first row emit light in substantially only a first direction as represented by rays 904*a*, and the light emitting diodes in the second row emit light in substantially only a second direction as represented by rays 904*b*. In FIG. 9*b*, light source 901 comprises side emitting diodes arranged in alternating first and second adjacent columns, and the light emitting diodes in the first column emit light in substantially only a first direction as represented by rays 902*a*, and the light emitting diodes in the second column emit light in substantially only a second direction as represented by rays 902*b*. In FIG. 9*c*, light source 905 comprises side emitting diodes arranged in alternating first and second adjacent rows, and the light emitting diodes in the first row emit light in substantially only a first direction as represented by rays 906a, and the light emitting diodes in the second row emit light in substantially only a second direction as represented by rays 906b.

Figure 10A:
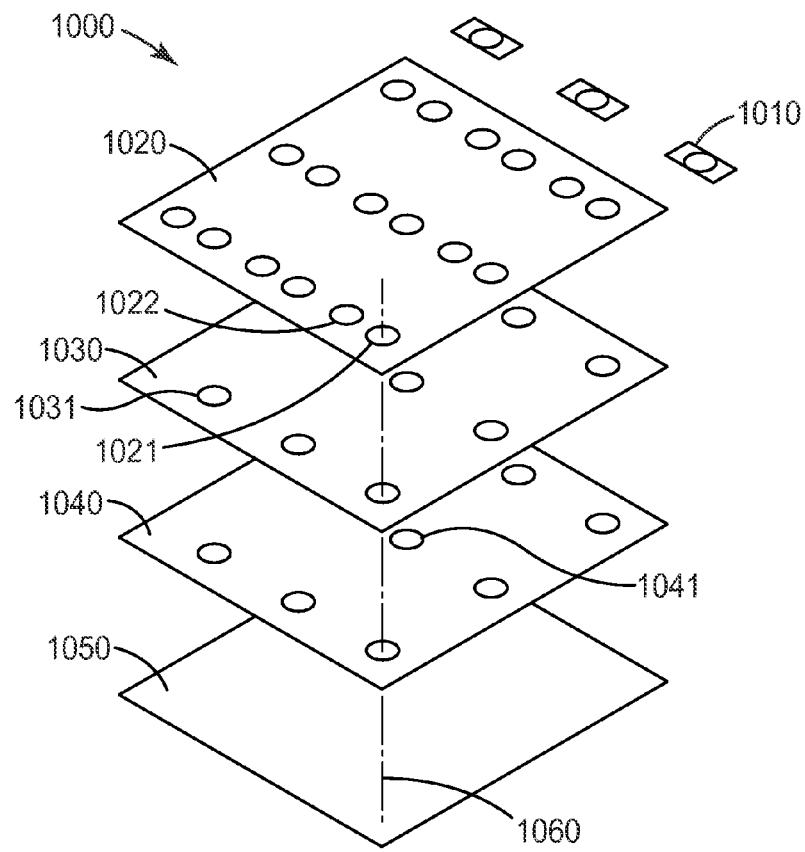
FIG. 10a shows a schematic perspective view of an exemplary flexible light source.
Figure 10B:
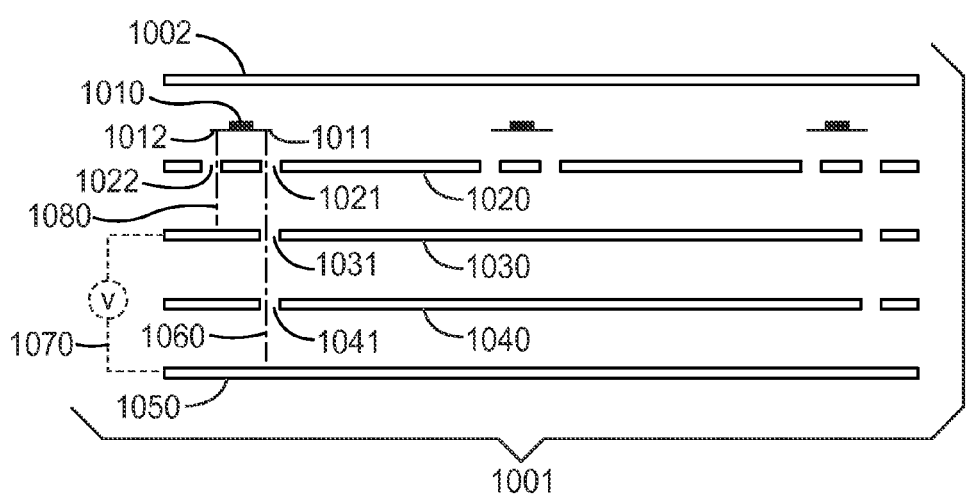

Exemplary flexible light mats are described in US 2008/0062688 A1 (Aeling et al.) incorporated by reference herein, and include 3M™ Flexible Light Mat 3635-1030. FIG. 10a shows a schematic perspective view of an exemplary flexible light mat or flexible light source. Flexible light mat 1000 comprises plurality of electrically interconnected light emitting diodes 1010 disposed on a flexible mat comprising optical film 1020, second conductor layer 1030, insulator layer 1040 and first conductor layer 1050 which are adjacent each other as shown in FIG. 10a. Optical film 1020 comprises pairs of third and fourth apertures, 1021 and 1022, respectively; second conductor layer 1030 comprises second apertures 1031 and insulator layer 1040 comprises first apertures 1041. Third aperture 1021 is aligned with second and first apertures as indicated by axis 1060. FIG. 10b shows a schematic cross-sectional view of illumination device 1001 that exemplifies use of flexible light mat 1000 with viscoelastic light guide 1002. Each light emitting diode 1010 has electrical contacts 1011 and 1012 that connect to the conductor layers as shown by the axes 1060 and 1080. Voltage source 1070 is used to power the light emitting diodes.

FIG. 11a shows a schematic perspective view of an exemplary flexible light mat or flexible light source. Flexible light mat 1100 comprises plurality of electrically interconnected light emitting diodes 1110 disposed on a flexible mat comprising first optical film 1130 comprising first and second opposing major surfaces; second optical film 1120 comprising third and fourth opposing major surfaces and having a plurality of apertures 1122, wherein the third major surface is adjacent the second major surface; first conductive trace 1131 disposed between the second and third major surfaces; and second conductive trace 1121 disposed on the fourth major surface; wherein each light emitting diode is electrically connected to the second conductive trace and the first conductive trace through one of the apertures, such that the light emitting diodes are electrically interconnected by the first and second conductor layers. A voltage source (not shown) is used to power the light emitting diodes.

For the embodiments shown in FIGS. 10a-10b and 11a-11b, the optical films can be or comprise any of those described above. The conductor layers and traces can be any metal used for conducting electricity such as those described in Aeling et al. In some embodiments, the insulator layers are specular or diffuse reflectors as described below. The insulator layer may comprise a specular reflector wherein the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M™ Company, for example, High Reflective Visible Mirror Film VM 2000 and High Transmission Mirror Film, and Vikuiti™ films such as Vikuiti™ Enhanced Specular Reflector.

In some embodiments, the insulator layer comprises a diffuse reflector wherein light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co. The particles may be dispersed in a polymeric material or binder. Binders include one or more polymers and may be, for example, any of the viscoelastic materials and adhesive materials (cold seal adhesives, etc.) described above. The binder may comprise a PSA. The binder and particles may be coated onto a substrate such that the thickness of the binder is greater than, less than or about the same as the diameter of the particles. The substrate may comprise a polymer, metal, specular reflector, and the like.

For example, the diffuse reflector may comprise a layer of barium sulfate particles loaded in a polyethylene terephalate film. Other constructions that provide a reflective surface are described in U.S. Pat. No. 7,481,563 (David et al.) incorporated herein by reference.

In some embodiments, the binder is light transmissive such that at least some of the light incident upon the layer enters the layer and becomes diffused. This diffused light is reflected upon being incident on a substrate that is a reflector. The diffusive material may comprise particles dispersed in a binder as described above. The refractive indices of the particles and binder may be different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.) incorporated herein by reference. For example, the particles may comprise hollow glass spheres having a mean diameter of about 18 um (SPHERICEL Grade 60P18 from Potters Industries Inc.), and the binder may comprise a PSA such as a silicone PSA.

The invention may be more completely understood in consideration of the following examples.

EXAMPLES

Examples 1-23

A flexible light mat was used as the light source. The flexible light mat includes white LEDs arranged on 1.7 in×1.7 in grid such that the population density is half with 24-25 LEDs per square foot and each LED lights 5.75 to 6 square inches. The construction of the flexible light mat includes from bottom to top: release liner/adhesive layer/polyethylene terephthalate film/copper/light emitting film/copper/light emitting film/LEDs. Viscoelastic lightguide was laminated to a diffuser, and strips of the diffuser with viscoelastic lightguide were adhered on top of the LEDs, along the length of the lanes of LEDs. Sign boxes having an area of about 1 square foot and variable depth were used. Each illumination device was placed on the bottom of the sign box. Diffuser faces were either a rigid diffusive Plexiglas such as 2447 (from Spartech Polycast) or were diffuser film that were laminated to clear Plexiglas. Samples were made with and without the lightguide adhered to the 3M Flexible Light Mat 3635-1000. Each combination of illumination device and depth of sign box was evaluated for visibility of the LEDs. Data are summarized in Table 1, and show that it is possible to reduce the depth of sign box by up to 50%.

TABLE 1

| Ex. | Lightguide Over LEDs | Face Diffuser | Diffuser % Transmission | LEDs Visible | Minimum Box Depth (in) |
|---|---|---|---|---|---|
| 1 | No | 2447 sign face Plex | | No | 3 |
| 2 | Yes | 2447 sign face Plex | | No | 3 |
| 3 | No | 2447 sign face Plex | | Yes | 2.5 |
| 4 | Yes | 2447 sign face Plex | | No | 2.5 |
| 5 | No | 3635-70[1] on clear plex | 55-60 | Yes | 3 |
| 6 | Yes | 3635-70[1] on clear plex | 55-60 | No | 3 |
| 7 | Yes | 3635-70[1] on clear plex | 55-60 | Yes | 2.5 |
| 8 | No | 3635-30[1] on clear plex | 35-40 | No | 3 |
| 9 | Yes | 3635-30[1] on clear plex | 35-40 | No | 3 |
| 10 | No | 3635-30[1] on clear plex | 35-40 | Yes | 2.5 |
| 11 | Yes | 3635-30[1] on clear plex | 35-40 | No | 2.5 |
| 12 | Yes | 3635-30[1] on clear plex | 35-40 | Yes | 2 |
| 13 | No | 3630-20[2] on clear plex | 25-30 | No | 3 |
| 14 | Yes | 3630-20[2] on clear plex | 25-30 | No | 3 |
| 15 | No | 3630-20[2] on clear plex | 25-30 | Yes | 2.5 |
| 16 | Yes | 3630-20[2] on clear plex | 25-30 | No | 2.5 |
| 17 | Yes | 3630-20[2] on clear plex | 25-30 | Yes | 2 |
| 18 | No | VT9407 on clear plex | 14-16 | No | 3 |
| 19 | Yes | VT9407 on clear plex | 14-17 | No | 3 |
| 20 | No | VT9407 on clear plex | 14-18 | Yes | 2.5 |
| 21 | Yes | VT9407 on clear plex | 14-16 | No | 2.5 |
| 22 | Yes | VT9407 on clear plex | 14-16 | No | 2 |
| 23 | Yes | VT9407 on clear plex | 14-16 | Yes | 1.5 |

[1] 3M™ SCOTCHCAL Diffuser Film
[2] 3M™ SCOTCHCAL Translucent Graphic Film
3) Similar to 3M™ SCOTCHCAL 3630-20 except has more white pigment.

Example 24

Using side emitting LEDs on a flexible light mat such as 3M™ Flexible Light Mat 3635-1030, more light can be couples into a viscoelastic lightguide since the emission angle is more compatible with the orientation of the lightguide. Side emitting LEDs will inject light that has a preferred lateral direction, and it light can be uniformly propagated in all directions by alternating the LED emission direction, either by alternating rows, or by alternating LED positions. The viscoelastic lightguide and diffuser film could be applied in strips between the LED rows where emission direction is alternating by LED positions, thereby allowing light to propagate uniformly in all directions. Thinner light box constructions can be made because less light will be propagated directly through the viscoelastic lightguide compared to the case for top emitting diodes. Example 24 is exemplified by FIGS. 10a-b and 11a-b.

A number of embodiments of the invention have been described. It is understood that various modifications may be made without departing from the spirit and scope of the invention. Accordingly, other embodiments are within the scope of the following claims.

What is claimed is:

1. An illumination device comprising:
   a viscoelastic lightguide comprising at least one pressure sensitive adhesive (PSA) so that the PSA is within the viscoelastic lightguide and the viscoelastic lightguide is configured to transport light within the viscoelastic lightguide by total internal reflection, wherein the viscoelastic lightguide defines opposing first and second major surfaces; and
   a flexible light mat comprising a plurality of electrically interconnected light emitting diodes disposed on a flexible mat, the light emitting diodes optically coupled to the viscoelastic lightguide, wherein light emitted by the light emitting diodes enters the viscoelastic lightguide at the first major surface and is transported within the viscoelastic lightguide by total internal reflection.

2. The illumination device of claim 1, wherein the second major surface of the viscoelastic lightguide comprises a plurality of features oriented to emit light being transported within the viscoelastic lightguide.

3. The illumination device of claim 1, further comprising an optical film disposed on the second major surface of the viscoelastic lightguide.

4. The illumination device of claim 3, wherein an interface formed between the optical film and the viscoelastic lightguide comprises a plurality of features oriented to extract light being transported within the viscoelastic lightguide.

5. The illumination device of claim 3, wherein the optical film comprises a plurality of features oriented to emit light extracted from the viscoelastic lightguide.

6. The illumination device of claim 1, wherein the light emitting diodes are side emitting diodes.

7. The illumination device of claim 6, wherein at least some of the light emitted by the side emitting diodes is emitted into air.

8. The illumination device of claim 6, wherein at least some of the light emitted by the side emitting diodes is emitted into polymeric material and subsequently extracted into the viscoelastic lightguide.

9. The illumination device of claim 1, wherein the light emitting diodes are arranged in alternating first and second adjacent rows, and the light emitting diodes in the first row emit light in substantially only a first direction, and the light emitting diodes in the second row emit light in substantially only a second direction.

10. The illumination device of claim 1, wherein the light emitting diodes are arranged in first and second adjacent columns, and the light emitting diodes in the first column emit light in substantially only a first direction, and the light emitting diodes in the second column emit light in substantially only a second direction.

\* \* \* \* \*

UNITED STATES PATENT AND TRADEMARK OFFICE
CERTIFICATE OF CORRECTION

PATENT NO. : 9,658,391 B2
APPLICATION NO. : 14/753320
DATED : May 23, 2017
INVENTOR(S) : Audrey Sherman Page 1 of 1

It is certified that error appears in the above-identified patent and that said Letters Patent is hereby corrected as shown below:

Column 18
Line 57, In Claim 8, delete "into" and insert -- into a --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*